US011174038B2

(12) United States Patent
Ouellette et al.

(10) Patent No.: US 11,174,038 B2
(45) Date of Patent: Nov. 16, 2021

(54) SYSTEM AND METHOD FOR ASSISTING A FLIGHT CREW WITH CONTROLLER-PILOT DATA LINK COMMUNICATION

(71) Applicant: BOMBARDIER INC., Dorval (CA)

(72) Inventors: Benoit Ouellette, Montreal (CA); Kosmas Colocythas, Laval (CA)

(73) Assignee: BOMBARDIER INC., Dorval (CA)

( * ) Notice: Subject to any disclaimer, the term of this patent is extended or adjusted under 35 U.S.C. 154(b) by 0 days.

(21) Appl. No.: 16/955,472

(22) PCT Filed: Dec. 18, 2018

(86) PCT No.: PCT/CA2018/051613
§ 371 (c)(1),
(2) Date: Jun. 18, 2020

(87) PCT Pub. No.: WO2019/119122
PCT Pub. Date: Jun. 27, 2019

(65) Prior Publication Data
US 2020/0369405 A1    Nov. 26, 2020

Related U.S. Application Data

(60) Provisional application No. 62/608,926, filed on Dec. 21, 2017.

(51) Int. Cl.
*B64D 45/00* (2006.01)
*B64D 43/00* (2006.01)
(52) U.S. Cl.
CPC .................................. *B64D 43/00* (2013.01)

(58) Field of Classification Search
None
See application file for complete search history.

(56) References Cited

U.S. PATENT DOCUMENTS

| 6,842,122 B1 | 1/2005 | Langner et al. |
| 9,293,050 B2 | 3/2016 | Judy |
| 9,424,753 B2 | 8/2016 | Walter |

(Continued)

OTHER PUBLICATIONS

International Searching Authority, International Search Report and Written Opinion dated Feb. 21, 2019 re: International Application No. PCT/CA2018/051613.

*Primary Examiner* — Brent Swarthout
(74) *Attorney, Agent, or Firm* — Norton Rose Fulbright Canada LLP (57) ABSTRACT

Systems and methods for assisting a flight crew of an aircraft with controller-pilot data link communication (CPDLC) are provided. A display device defines a display area on a flight deck of the aircraft. A controller is operatively coupled to the display device and configured to control a presence of a CPDLC window containing a CPDLC message in the display area. A plurality of tactile buttons are disposed proximally to each other on a glare shield panel of the flight deck. The plurality of tactile buttons comprises a first tactile button operatively coupled to the controller for selectively instructing the controller to cause the presence of the CPDLC window in the display area by actuation of the first tactile button, and a second tactile button configured to permit the flight crew to respond to the CPDLC message by actuation of the second tactile button.

18 Claims, 6 Drawing Sheets

(56) References Cited

U.S. PATENT DOCUMENTS

| | | |
|---|---|---|
| 9,459,120 B2 | 10/2016 | Wischmeyer |
| 9,592,921 B2 | 3/2017 | Dominic et al. |
| 9,911,337 B1 | 3/2018 | Shapiro |
| 2005/0049762 A1 | 3/2005 | Dwyer |
| 2005/0203675 A1 | 9/2005 | Griffin, III et al. |
| 2008/0163093 A1 | 7/2008 | Lorido |
| 2014/0253585 A1 | 9/2014 | Dominic et al. |
| 2015/0161896 A1* | 6/2015 | Judy ............... G06F 3/041 340/901 |
| 2015/0212701 A1* | 7/2015 | Rodney ............ G08G 5/0021 715/771 |
| 2016/0019794 A1 | 1/2016 | Dominic et al. |
| 2016/0155337 A1 | 6/2016 | Krishna et al. |
| 2017/0076611 A1* | 3/2017 | Shamasundar ...... G08G 5/0047 |

\* cited by examiner

SYSTEM AND METHOD FOR ASSISTING A FLIGHT CREW WITH CONTROLLER-PILOT DATA LINK COMMUNICATION

CROSS-REFERENCE TO RELATED APPLICATION(S)

This application is a national phase application under 35 U.S.C. 371 of International Patent Application No. PCT/CA2018/051613 filed on Dec. 18, 2018, which claims priority from U.S. Provisional Patent Application Ser. No. 62/608,926 filed on Dec. 21, 2017, the entire content of which is incorporated herein by reference.

TECHNICAL FIELD

The present disclosure relates generally to aircraft, and more specifically to avionics systems of aircraft.

BACKGROUND

Means for facilitating communication between a flight crew and the authorities on the ground have traditionally centered around voice-based communication but text-based communication methods are now becoming preferred. Not only do text-based communication methods allow for receipt of information from multiple sources substantially simultaneously by the flight crew and reduced risk of misunderstandings, these methods make it possible to automate various air-traffic control processes. Thus, instead of requiring individual persons to communicate orally with flight crews, computer systems allow flight-traffic controllers to send messages to multiple aircraft at the same time.

The requirement to display such text based messages to the flight crew and also allow the flight crew to respond can cause challenges with the design of flight decks and especially those of smaller aircraft due to the limited "real estate" available on flight decks.

SUMMARY

In accordance with a broad aspect, there is provided A system for assisting a flight crew of an aircraft with controller-pilot data link communication (CPDLC). The system comprises a display device defining a display area on a flight deck of the aircraft; a controller operatively coupled to the display device and configured to control a presence of a CPDLC window containing a CPDLC message in the display area of the display device; and a plurality of tactile buttons disposed proximally to each other on a glare shield panel of the flight deck of the aircraft, the plurality of tactile buttons comprising a first tactile button operatively coupled to the controller for selectively instructing the controller to cause the presence of the CPDLC window in the display area of the display device by actuation of the first tactile button, the plurality of tactile buttons comprising a second tactile button configured to permit the flight crew to respond to the CPDLC message by actuation of the second tactile button.

In some embodiments, the CPDLC window contains an indication of a response option for responding to the CPDLC message, the response option being associated with the second tactile button.

In some embodiments, the second tactile button is operatively coupled to the controller for instructing the controller to cause the CPDLC window to be absent from the display area of the display device.

In some embodiments, the first tactile button is operatively coupled to the controller for instructing the controller to toggle between the presence and absence of the CPDLC window in the display area of the display device by repeated actuation of the first tactile button.

In some embodiments, the plurality of tactile buttons comprises a plurality of second tactile buttons configured to permit the flight crew to respond to the CPDLC message; the CPDLC window contains indications of response options for responding to the CPDLC message; and each response option is associated with a respective one of the second tactile buttons.

In some embodiments, the controller is configured to cause the display area of the display device to display a notification indicating the existence of any CPDLC messages requiring a response from the flight crew.

In some embodiments, the controller is configured to cause the notification to be displayed on the display area of the display device when the CPDLC window is not present in the display area of the display device.

In some embodiments, the notification is displayed within a status bar on the display area, and wherein the CPDLC window is located proximate the status bar when the CPDLC window is present in the display area of the display device.

In some embodiments, the display device is a multi-function display of the flight deck.

In some embodiments, the CPDLC window, when present in the display area, at least partially overlays a display format that is displayed in the display area when the CPDLC window is absent from the display area.

In accordance with another broad aspect, there is provided an aircraft flight deck comprising the system defined hereinabove.

In accordance with a further broad aspect, there is provided an aircraft comprising the system defined in hereinabove.

In accordance with a still further broad aspect, there is provided a method for assisting a flight crew of an aircraft with controller-pilot data link communication (CPDLC). A CPDLC message is received at the aircraft. A first instruction to selectively cause the presence of a CPDLC window containing the CPDLC message in a display area of a display device of the flight deck is received via a first tactile button disposed on a glare shield panel of a flight deck of the aircraft. A second instruction for responding to the CPDLC message is received via a second tactile button disposed on the glare shield panel of the flight deck and proximal to the first tactile button.

In some embodiments, the CPDLC window contains an indication of a response option for responding to the CPDLC message, the response option being associated with the second tactile button.

In some embodiments, the method further comprises receiving a third instruction for causing the CPDLC window to be absent from the display area of the display device.

In some embodiments, repeated receipt of the first instruction by repeated actuation of the first tactile button causes a toggle between the presence and absence of the CPDLC window in the display area of the display device.

In some embodiments, the CPDLC window contains a plurality of indications of response options for responding to the CPDLC message, the response options being respectively associated with a plurality of second tactile buttons.

In some embodiments, the method further comprises causing the display area of the display device to display a notification indicating the existence of any CPDLC messages requiring a response from the flight crew.

In some embodiments, causing the display area of the display device to display the notification comprises causing the notification to be displayed on the display area of the display device when the CPDLC window is not present in the display area of the display device.

In some embodiments, causing the display area of the display device to display the notification comprises displaying the notification within a status bar in the display area, and wherein the CPDLC window is located proximate the status bar when the CPDLC window is present in the display area of the display device.

In some embodiments, the display device is a multi-function display of a flight deck of the aircraft.

In some embodiments, the first instruction causes the CPDLC window to at least partially overlay a display format that is displayed on the display area when the CPDLC window is absent from the display area.

Features of the systems, devices, and methods described herein may be used in various combinations, and may also be used for the system and computer-readable storage medium in various combinations.

BRIEF DESCRIPTION OF THE DRAWINGS

Further features and advantages of embodiments described herein may become apparent from the following detailed description, taken in combination with the appended drawings, in which.

It will be noted that throughout the appended drawings, like features are identified by like reference numerals.

DETAILED DESCRIPTION

During operation of an aircraft, a flight crew operating the aircraft can receive messages in text form. These messages can include information provided by an air traffic authority, a corporate authority, a weather service, and the like. One type of message that can be received is "controller-pilot data link communication" (CPDLC) messages. CPDLC messages include information relating to changes in a flight plan, to take-off and landing instructions, and the like. Although the foregoing discussion focuses principally on CPDLC messages, it should be understood that the systems and methods discussed herein can be applied to other text-based communication between a flight crew and a relevant authority. In some embodiments, the systems and methods disclosed herein can permit the selective display of CPDLC messages to the flight crew without requiring permanent real estate on the flight deck dedicated to a CPDLC window.

Figure 1:
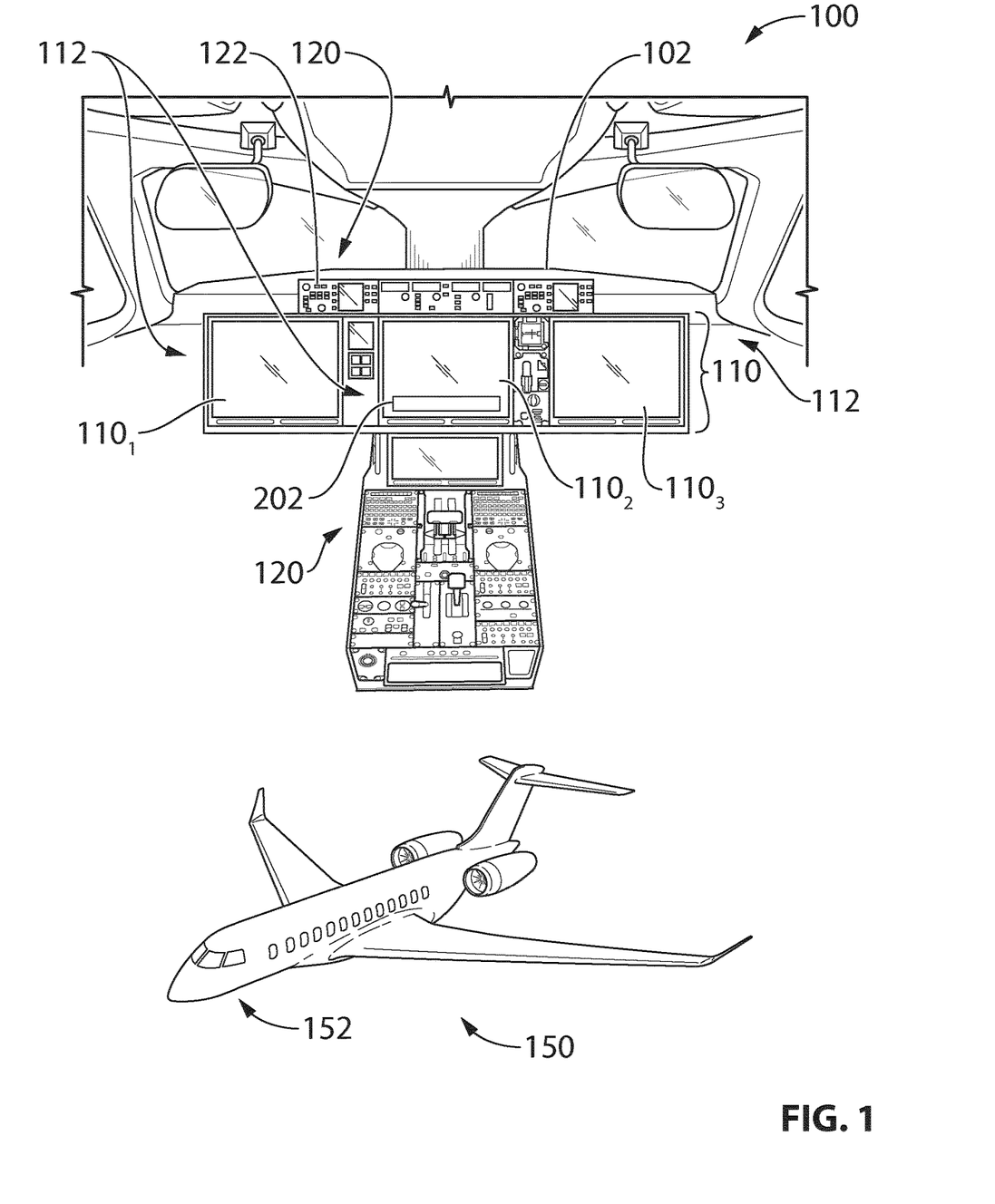
FIG. 1 is a diagram of an example flight deck including a system for assisting a flight crew of an aircraft with controller-pilot data link communication (CPDLC)

With reference to FIG. 1, there is illustrated an example flight deck 100 of an aircraft 150. The flight deck 100 is equipped with one or more display devices 110, including display devices $110_1$, $110_2$, and $110_3$ in the illustrated embodiment. It should be noted that the display devices 110 of the flight deck 100 includes any suitable number of display devices, as is feasible given the size of the flight deck 100 and any other constraints. Each of the display devices 110 defines a display area 112 in which the display devices 110 can display various graphical or textual elements. For example, the display area 112 can display one or more maps, flight plan data, instrumentation data, or any other suitable information in one or more display formats.

The flight deck 100 is also equipped with a plurality of controls 120, which include buttons, switches, levers, flight sticks, flight yokes, and the like. In some embodiments, the controls 120 include controls which can be integrated into one or more of the display panels 110, for example a touch interface. Still other types of controls are considered. In some embodiments, one or more of the controls 120, for example buttons 122, are located on a glare shield panel 102 of the flight deck 100.

The flight deck 100 is disposed in a cockpit 152 or similar control centre of the aircraft 150 and is accessible to the flight crew. As used herein, the term "flight crew" is intended to encompass one or more individuals responsible for the operation of the aircraft 150. Such individuals can, for example, include the pilot and/or the co-pilot. When a CPDLC message, or other message, is received at the aircraft 150, the flight crew is able to interact with the flight deck 100 via the controls 120, for example, to view and respond to the message.

Figure 2:
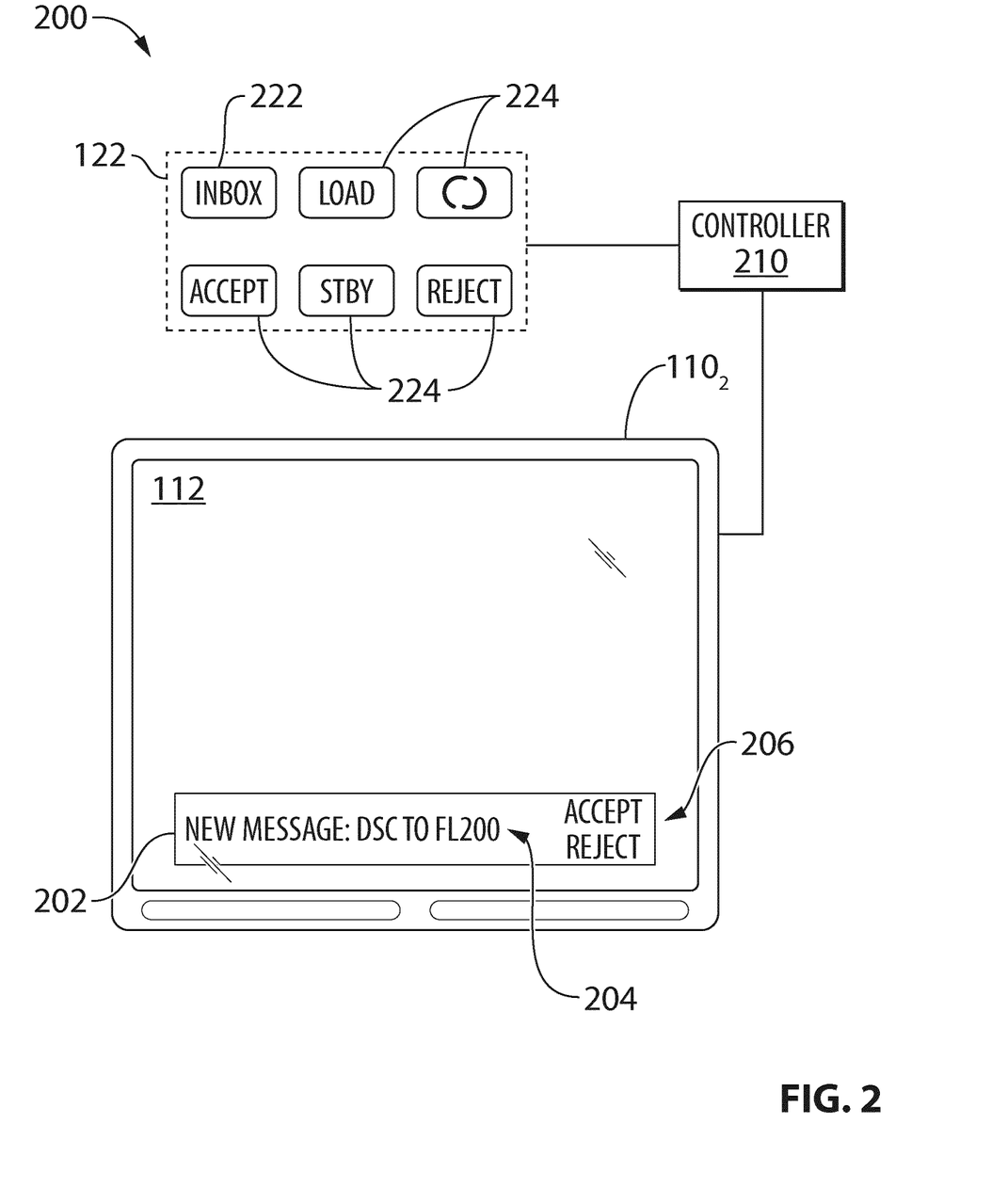
FIG. 2 is a block diagram of an example system for assisting the flight crew with CPDLC.

With reference to FIG. 2, a system 200 for assisting the flight crew with CPDLC, for example with the selective presentation of CPDLC messages, is illustrated. The system 200 includes one of the display panels 110, for example the display device $110_2$, a controller 210, and buttons 122, which can be a subset of the controls 120, for example a subset of the controls 120 located on the glare shield panel 102 of the flight deck 100, and which include an 'INBOX' button 222 and one or more response buttons 224. In some embodiments, the buttons 122 can be located proximate the display device $110_2$. For example, the buttons 122 are located directly above the display device $110_2$, or are otherwise adjacent or immediately next to the display device $110_2$. For instance, the display device $110_2$ can be surrounded by a bezel or other border, and the buttons 122 can be located substantially adjacent or next to the bezel. In some embodiments, the buttons 122 are located proximate a primary flight display; in other embodiments, the buttons 122 are located proximate a multifunction display The controller 210 or other control device can be operatively coupled to the display device $110_2$ for causing the display device $110_2$ to display one or more graphical formats within the display area 112 of the display device $110_2$. The display device $110_2$ can be a primary flight display, a multifunction display, or any other suitable display device located in the flight deck 100. The graphical formats include visual representations of various information of interest to the flight crew, including maps, flight plan data, instrumentation data, etc. The controller 210 can also be capable of causing the display of graphical formats based on input received from the flight crew. For instance, the controller 210 can be configured for causing the display of certain particular graphical formats based on the received input, for instance CPDLC-related graphical formats, as described hereinbelow.

In some embodiments, the controller 210 is configured to control a presence of a CPDLC window 202, which contains a received CPDLC message 204, in the display area 112. The CPDLC window 202 can be a popup window, a docked window, or any other suitable kind of window, and the CPDLC message 204 can be represented within the CPDLC window 202 in any suitable way. In addition, the CPDLC window 202 can include one or more options for responding to the CPDLC message 204, for example response indications 206. The responses indications 206 can include any number of suitable responses, for example 'ACCEPT', 'REJECT', 'STANDBY', 'LOAD', and the like. The 'ACCEPT' and 'REJECT' responses indications 206 allow the flight crew to indicate whether they accept or reject the contents of the CPDLC message 204, for example when the CPDLC message 204 requests a change in flight plan or course. The 'STANDBY' response allows the flight crew to indicate that they will respond to the CPDLC message 204 at a later time. In some cases, selecting the 'STANDBY' response includes marking the CPDLC message 204 as unread. The 'LOAD' response can cause the controller 210 to load a separate messaging application on the display device $110_2$, for instance if the whole contents of the CPDLC message 204 cannot be displayed within the CPDLC window 202.

In some embodiments, the controller 210 causes the display device $110_2$ to display the CPDLC window 202 in the display area 112 in response to an input received from the flight crew via one of the buttons 122, for example the 'INBOX' button 222. In other embodiments, the controller 210 causes the display device $110_2$ to display the CPDLC window 202 in the display area 112 in response to receipt of the CPDLC message, in a substantially automatic fashion. The CPDLC window 202 can display the most recently received message, the most recent unread message, or any other suitable message based on a priority scheme or other technique. In some embodiments, the controller 210 is configured for determining the existence of a CPDLC message requiring a response from the flight crew and for presenting that CPDLC message in the CPDLC window 202.

The buttons 122 can be a plurality of tactile (e.g., push) buttons which are disposed proximally to each other, for example on the glare shield panel 102 of the flight deck 100 of the aircraft 150, and include the 'INBOX' button 222 and the response buttons 224. The buttons 122 can be configured to be actuated by compression, by contact, by proximity, or using any other suitable form of interaction. In the illustrated example of FIG. 2, there are six (6) total buttons grouped together in a common region of the glare shield panel 102, but other examples can include any suitable number of buttons. The group of tactile buttons 122 can optionally be disposed proximate (e.g., adjacent) to the applicable display area 212 in which CPDLC window 202 is to be selectively displayed.

The 'INBOX' 222 button is operatively coupled to the controller 210 for selectively instructing the controller 210 to cause the presence of the CPDLC window 202 in the display area 112 of the display device $110_2$ when the 'INBOX' button 222 is actuated. Thus, when a member of the flight crew actuates the 'INBOX' button 222 by pressing for example, the controller 210 causes the CPDLC window 202 to be displayed in the display area 212. In some embodiments, when the 'INBOX' button 222 is actuated and the CPDLC window 202 is already displayed, the controller 210 causes the CPDLC window 202 to be removed (e.g., absent) from the display area 212. Accordingly, the actuation of INBOX button 222 can serve to selectively cause the presence or absence of the CPDLC window 202 in the display area 212. In other words, INBOX button 222 can serve to instruct the controller 210 to toggle between the presence and absence of the CPDLC window 202 in the display area 212 of the display device 110 by repeated actuation of the INBOX button 222.

The response buttons 224 are configured to permit the flight crew to respond to the CPDLC message 204 by the activation of one of the response buttons 224. The response from the flight crew can cause a message to be transmitted from the aircraft 152 in response to a CPDLC message 204 and/or can cause a (e.g., auto flight) system of the aircraft 152 to carry out some action associated with the CPDLC message 204 (e.g., execute a change in altitude commanded by the CPDLC message 204). Each of the response buttons 224 can be associated with a particular response option displayed as responses indications 206 in the CPDLC window 202. For example, the buttons 224 include 'ACCEPT', 'REJECT', 'STANDBY', and 'LOAD' buttons, each associated with a corresponding response indications 206. Other buttons, including a 'REFRESH' button, which causes the controller 210 to check for the existence of any new CPDLC messages and display a most recently received message in the CPDLC window 202, are also considered.

Figure 3A:
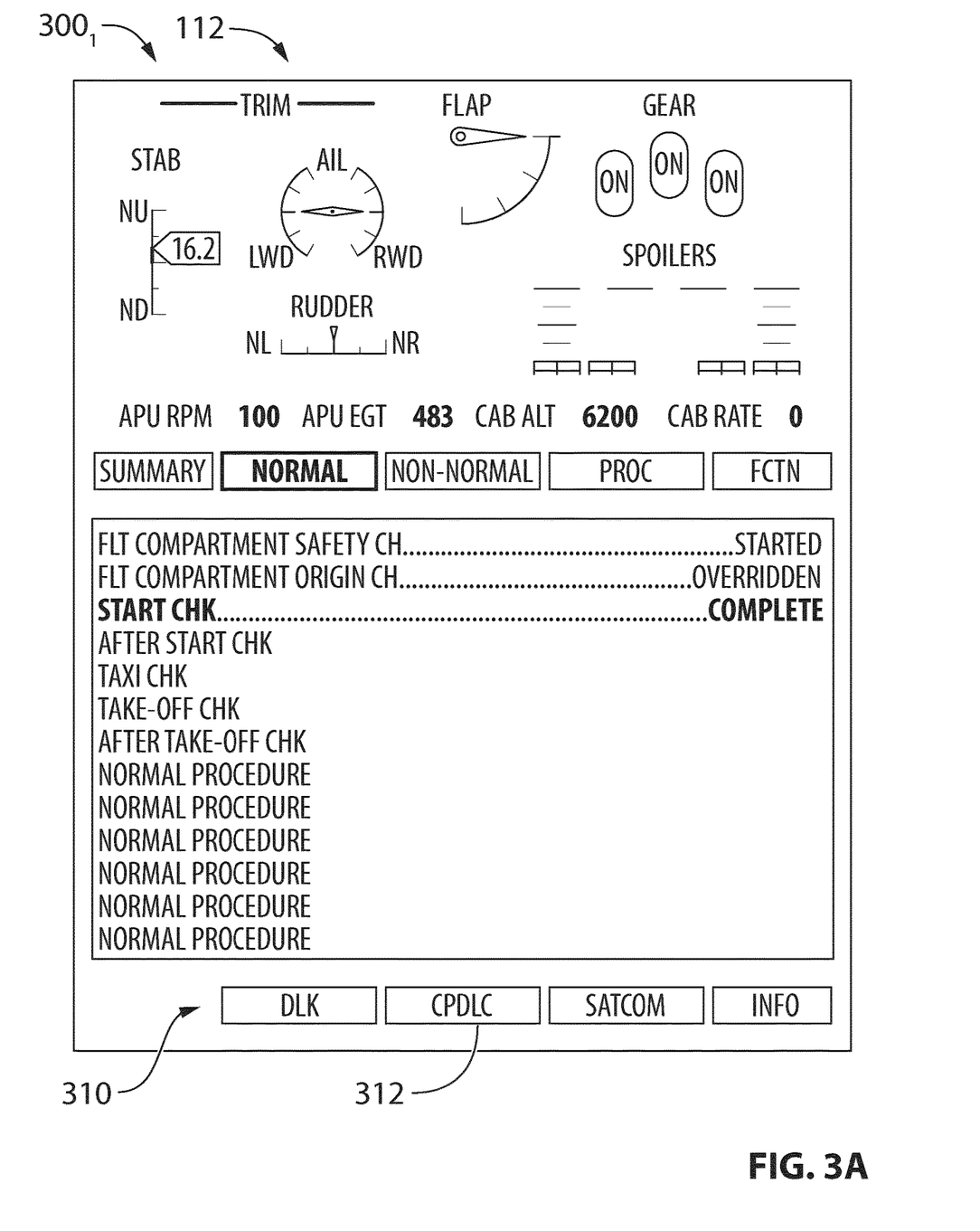
FIGS. 3A and 3B show an example display area of a display device of the flight deck of FIG. 1 with a CPDLC window absent from the display area and present in the display area respectively.
Figure 3B:
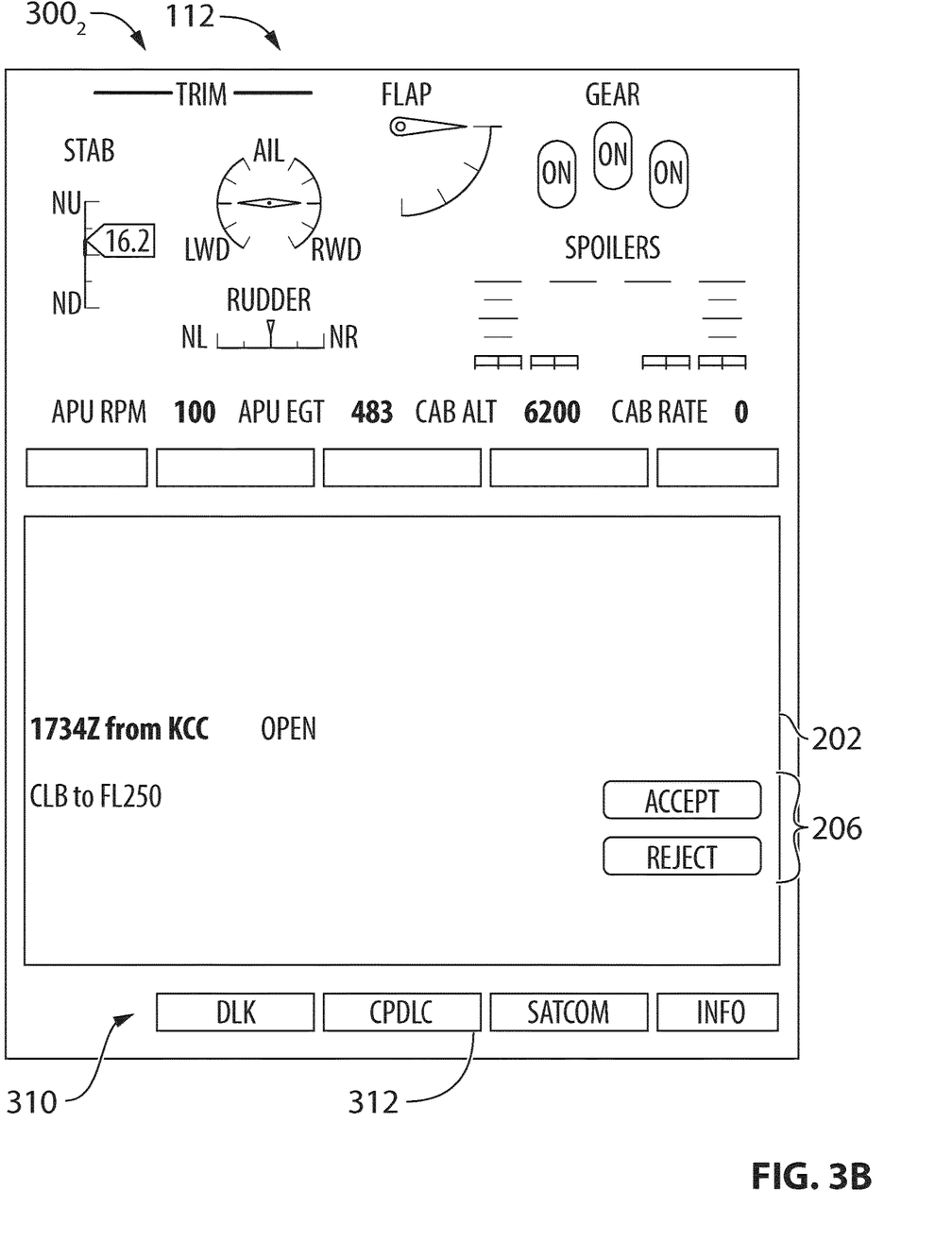

With reference to FIGS. 3A and 3B, example display areas $300_1$ and $300_2$ of an example implementation of the system 200 are shown. In display area $300_1$, the display area 112 is shown as displaying various flight-related information and a status bar 310. The status bar 310 is a portion of the display area 112 which serves to provide notifications or alerts regarding various flight systems. For example, notification 312 indicates that a new unread CPDLC message has been received. The status bar 310 can show notifications 312 in any suitable way, including boxes, dots, circles, toasts, and the like, and can use contrasting colours, highlighting, blinking, flashing, motion, or any other suitable technique.

With continued reference to FIG. 3B, when the flight crew actuates the 'INBOX' button 222, the controller 210 causes the CPDLC window 202 to be selectively displayed in the display area 112. In the embodiment illustrated in FIG. 3B, the CPDLC window 202 is shown as being proximate to the status bar 310. In some embodiments, the CPDLC window 202 is displayed as extending from the status bar 310. In other embodiments, the CPDLC window 202 is a popup window that is spaced from the status bar 310. In some further embodiments, the CPDLC window 202 is docked along a side of the display area 112. Still other embodiments are considered. For example, as illustrated in FIG. 3B, the CPDLC window 202 at least partially overlays the graphical format which was previously being displayed in the display area 112. This reduces the amount of separation between the task previously being performed by the flight crew prior to the display of the CPDLC window 202. In addition, in some embodiments the 'INBOX' button 222 can be subsequently actuated to hide the CPDLC window 202, returning the display area 112 to the previously-displayed graphical format(s). Alternatively, upon responding to the CPDLC message 204 via one of the response buttons 224, the CPDLC window 202 can be automatically removed from display area 112.

In addition, the CPDLC window 202 displays the CPDLC message 204, and can display metadata relating to the CPDLC message 204, for example a time of receipt, an identity of a sending authority, and the like. The CPDLC window 202 also displays response indications 206, in this case 'ACCEPT' and 'REJECT', although other response options can also be available. By interacting with the response buttons 224, the flight crew can respond to the CPDLC message 204. In some embodiments, upon responding to the CPDLC message 204 via one of the response buttons 224, the CPDLC window 202 is automatically removed from display area 112.

By providing the 'INBOX' button 222, the flight crew can selectively access newly received CPDLC messages via a single interaction. This reduces the distraction to the flight crew, as there is no need to navigate menus to launch an inbox application. Moreover, since the received CPDLC message 204 can be overlaid over existing graphical formats via CPDLC window 202, no screen real estate needs to be permanently allocated to an inbox application on the flight deck 100. In addition, the response buttons 224 are located on the glare shield panel 102 proximate the 'INBOX' button 222, reducing the range of movement required of the flight crew to view and respond to CPDLC messages. When the 'INBOX' and response buttons 222, 224 are located proximate the display area 112 of the display device $110_2$ where the CPDLC window 202 is displayed, this also reduces the visual effort required of the flight crew to located the 'INBOX' button 222, view the CPDLC message 204, and then locate the appropriate response button 224 to respond to the received CPDLC message 204 in a tactical manner. Furthermore, the fixed nature of the 'INBOX' and response buttons 222, 224 means the flight crew can easily remember the location of the appropriate buttons 222, 224 when CPDLC messages 204 are received. This allows the flight crew to access inbox functionality and CPDLC messages 204 in a heads-up/head forward operation.

Figure 4:
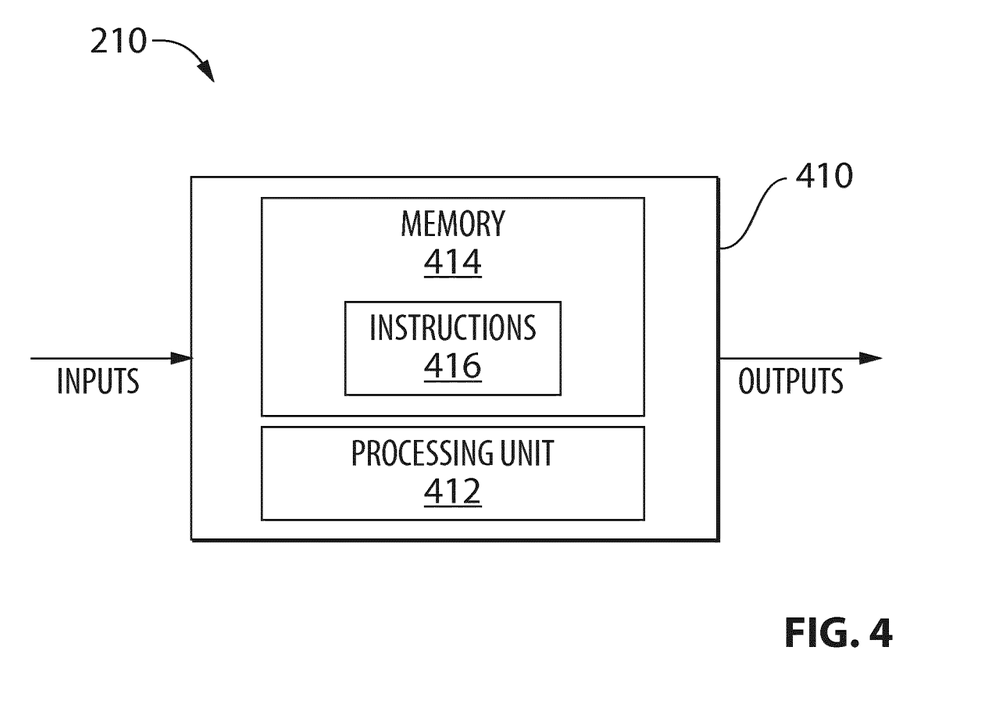
FIG. 4 is a block diagram of an example computing system for implementing the system of FIG. 2.

With reference to FIG. 4, the controller 210 can comprise a computing device 410, comprising a processing unit 412 and a memory 414 which has stored therein computer-executable instructions 416. The processing unit 412 can comprise any suitable devices configured to cause a series of steps to be performed so as to implement the controller 210 such that instructions 416, when executed by the computing device 410 or other programmable apparatus, can cause the functions/acts/steps specified in the methods described herein to be executed. The processing unit 412 can comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 414 can comprise any suitable known or other machine-readable storage medium. The memory 414 can comprise non-transitory computer readable storage medium such as, for example, but not limited to, an electronic, magnetic, optical, electromagnetic, infrared, or semiconductor system, apparatus, or device, or any suitable combination of the foregoing. The memory 414 can include a suitable combination of any type of computer memory that is located either internally or externally to device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory 414 can comprise any storage means (e.g., devices) suitable for retrievably storing the computer-executable instructions 416 executable by processing unit 412.

Figure 5:
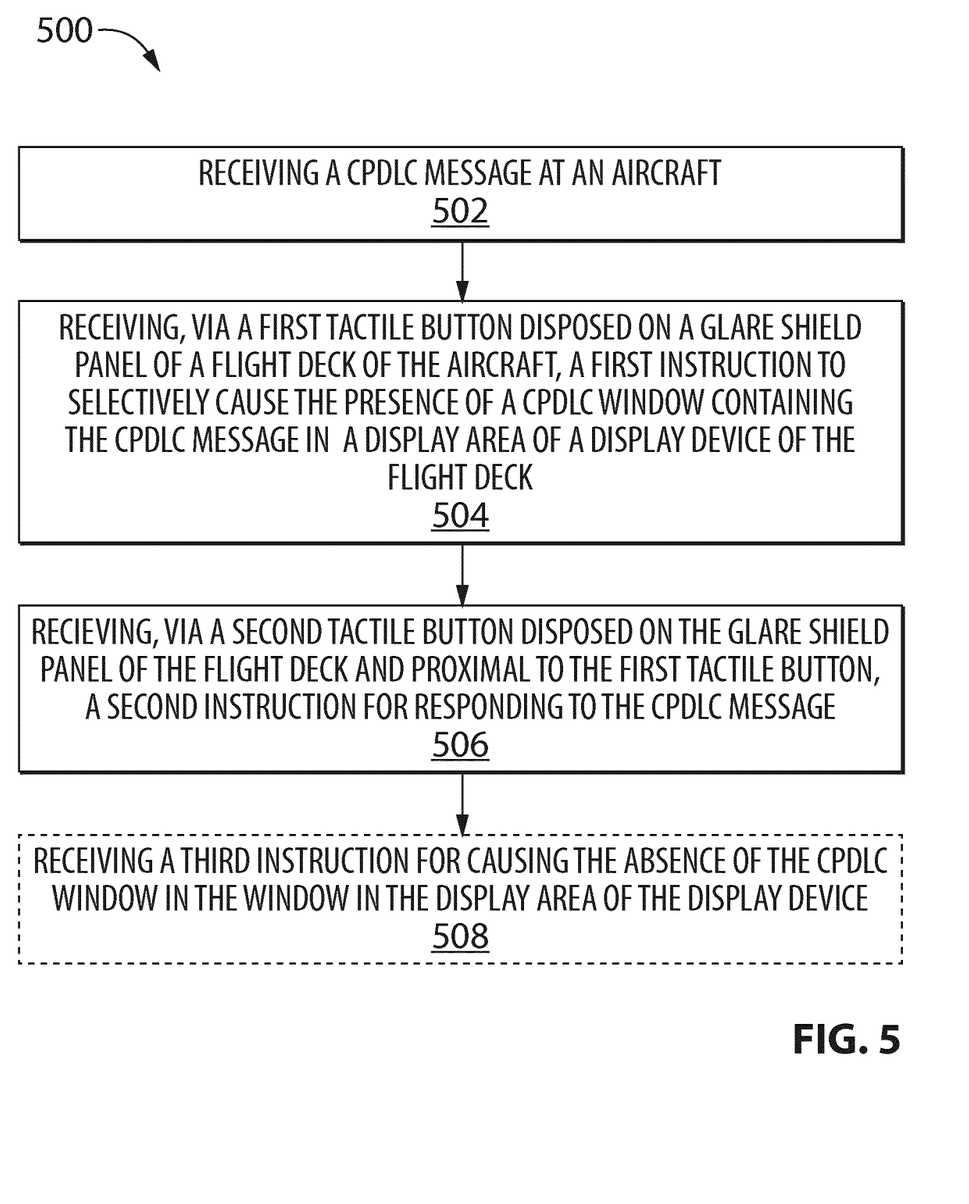
FIG. 5 is a flowchart illustrating an example method for assisting a flight crew with CPDLC.

With reference to FIG. 5, there is shown a method 500 for assisting a flight crew of an aircraft with CPDLC, for example a crew of the aircraft 150. The method 500 can be implemented, for example, by the computing device 410.

At step 502, a CPDLC message 204 is received at the aircraft 150. The CPDLC message 204 can be received from any suitable authority, and can contain any kind of information, including changes in a flight plan, take-off and landing instructions, weather information, and the like. The CPDLC message 204 can be received via any suitable communications systems.

At step 504, a first instruction to selectively cause the presence of a CPDLC window 202 containing the CPDLC message 204 in a display area 112 of a display device 110 of the flight deck 100 is received via a first tactile button, for example the 'INBOX' button 222, disposed on a glare shield panel of the flight deck 100 of the aircraft 150, for example the glare shield panel 102. For example, the 'INBOX' button 222 is actuated, thereby producing an instruction sent to the controller 210 to cause the CPDLC window 202 to be displayed in the display area 112 of the display device $110_2$. In response to the first instruction, the controller 210 is configured to cause the CPDLC window 202 to be displayed in the display area 112 (e.g., change from an absent state to a present state in the display area 112).

At step 506, a second instruction for responding to the CPDLC message is received via a second tactile button, for example one of the response buttons 224 disposed on the glare shield panel 102 of the flight deck 100 and proximal to the first tactile button 222. For example, one of the response buttons 224 located proximate to the 'INBOX' button 222 is actuated, thereby producing a response to the CPDLC message 204 which can be received by the controller 210 or any other suitable processing system. In response to the second instruction, the controller 210 can be configured to initiate or cause an alteration of a flight plan, an update of a database of weather information, a communication of a response from the flight crew to another party and/or taking any other suitable action, based on the response selected by the flight crew.

Optionally, at step 508, a third instruction for causing the absence of the CPDLC window 202 is received. The third instruction can be received via the 'INBOX' button 222 or concurrent with the second instruction when the response button 224 is actuated. For example, the 'INBOX' button 222 can be actuated when the CPDLC window 202 is displayed, causing the CPDLC window 202 to be removed from display area 112. Alternatively, actuating one of the response buttons 224 can cause both the response to be sent to the controller 210 and the CPDLC window 202 to be removed from display area 112.

The methods and systems for assisting a flight crew of an aircraft 150 with CPDLC messages 204 described herein may be implemented in a high-level procedural or object-oriented programming or scripting language, or a combination thereof, to communicate with or assist in the operation of a computer system, for example the computing device 410. Alternatively, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or more specifically the at least one processing unit 412 of the computer 410, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Various aspects of the methods and systems disclosed herein, as well as the flight deck or aircraft itself, may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the preferred embodiments set forth in the examples, but should be given the broadest reasonable interpretation consistent with the description as a whole.

The invention claimed is:

1. A system for assisting a flight crew of an aircraft with controller-pilot data link communication (CPDLC), the system comprising:
   a display device defining a display area on a flight deck of the aircraft;
   a controller operatively coupled to the display device and configured to control a presence of a CPDLC window containing a CPDLC message in the display area of the display device; and
   a plurality of tactile buttons disposed proximally to each other on a glare shield panel of the flight deck of the aircraft, the plurality of tactile buttons comprising a first tactile button operatively coupled to the controller for selectively instructing the controller to cause the presence of the CPDLC window in the display area of the display device by actuation of the first tactile button, the plurality of tactile buttons comprising a second tactile button configured to permit the flight crew to respond to the CPDLC message by actuation of the second tactile button;
   wherein:
      the plurality of tactile buttons comprises a plurality of second tactile buttons configured to permit the flight crew to respond to the CPDLC message;
      the CPDLC window contains indications of response options for responding to the CPDLC message; and
      each response option is associated with a respective one of the second tactile buttons.

2. The system of claim 1, wherein the second tactile button is operatively coupled to the controller for instructing the controller to cause the CPDLC window to be absent from the display area of the display device.

3. The system of claim 1, wherein the first tactile button is operatively coupled to the controller for instructing the controller to toggle between the presence and absence of the CPDLC window in the display area of the display device by repeated actuation of the first tactile button.

4. The system of claim 1, wherein the controller is configured to cause the display area of the display device to display a notification indicating the existence of any CPDLC messages requiring a response from the flight crew.

5. The system of claim 4, wherein the controller is configured to cause the notification to be displayed on the display area of the display device when the CPDLC window is not present in the display area of the display device.

6. The system of claim 4, wherein the notification is displayed within a status bar on the display area, and wherein the CPDLC window is located proximate the status bar when the CPDLC window is present in the display area of the display device.

7. The system of claim 1, wherein the display device is a multi-function display of the flight deck.

8. The system of claim 1, wherein the CPDLC window, when present in the display area, at least partially overlays a display format that is displayed in the display area when the CPDLC window is absent from the display area.

9. An aircraft flight deck comprising the system defined in claim 1.

10. An aircraft comprising the system defined in claim 1.

11. A method for assisting a flight crew of an aircraft with controller-pilot data link communication (CPDLC), the method comprising:
   receiving a CPDLC message at the aircraft;
   receiving, via a first tactile button disposed on a glare shield panel of a flight deck of the aircraft, a first instruction to selectively cause the presence of a CPDLC window containing the CPDLC message in a display area of a display device of the flight deck; and
   receiving, via a second tactile button disposed on the glare shield panel of the flight deck and proximal to the first tactile button, a second instruction for responding to the CPDLC message;
   wherein the CPDLC window contains a plurality of indications of response options for responding to the CPDLC message, the response options being respectively associated with a plurality of second tactile buttons disposed on the glare shield panel of the flight deck.

12. The method of claim 11, further comprising receiving a third instruction for causing the CPDLC window to be absent from the display area of the display device.

13. The method of claim 11, wherein repeated receipt of the first instruction by repeated actuation of the first tactile button causes a toggle between the presence and absence of the CPDLC window in the display area of the display device.

14. The method of claim 11, further comprising causing the display area of the display device to display a notification indicating the existence of any CPDLC messages requiring a response from the flight crew.

15. The method of claim 14, wherein causing the display area of the display device to display the notification comprises causing the notification to be displayed on the display area of the display device when the CPDLC window is not present in the display area of the display device.

16. The method of claim 14, wherein causing the display area of the display device to display the notification comprises displaying the notification within a status bar in the display area, and wherein the CPDLC window is located proximate the status bar when the CPDLC window is present in the display area of the display device.

17. The method of claim 11, wherein the display device is a multi-function display of a flight deck of the aircraft.

18. The method of claim 11, wherein the first instruction causes the CPDLC window to at least partially overlay a display format that is displayed on the display area when the CPDLC window is absent from the display area.

\* \* \* \* \*